INVENTOR
RALPH E. KROY
BY
Burton & Parker
ATTORNEYS

United States Patent Office 3,519,787
Patented July 7, 1970

3,519,787
WELDING APPARATUS
Ralph E. Kroy, Utica, Mich., assignor to Warren Fastener Corporation, Mount Clemens, Mich., a corporation of Michigan
Filed Apr. 22, 1968, Ser. No. 723,020
Int. Cl. B23k 9/20
U.S. Cl. 219—98
15 Claims

ABSTRACT OF THE DISCLOSURE

A stud welding apparatus featuring a plurality of energy storage and discharge devices each connected in a separate discharge circuit with the stud and workpiece and separately controllably dischargeable therethrough to produce a current of variably extendable welding intensity duration greater than that produced by any one of the discharge devices alone.

BACKGROUND OF THE INVENTION

Field of the invention

The invention relates to the field of stud welding apparatus and has particular, though not exclusive, application for drawn arc stud welding systems utilizing stored energy discharge devices.

Prior art

Prior forms of stored energy discharge devices used in drawn arc stud welding apparatus utilize a charged capacitor as the main source of weld energy and an inductor device connected in series with the capacitor to prolong the duration of the condenser discharge. In addition to furnishing the welding current, the capacitor also furnishes the pilot arc current to produce the drawn arc and establish an arc path of low intensity for the subsequently applied higher intensity welding current applied therethrough.

Apart from the physical size of the inductor, the use of inductor devices in such environments reduces the peak intensity of the available current and also has a tendency to promote ringing oscillations in the capacitor inductor circuit with consequent undesirable reversal of current in the discharge circuit.

The magnetic field produced by the inductor is of high intensity and may require shielding of the inductor and/or of any field sensitive, pulse forming or triggerable electronic control components used in the system to prevent false triggering and erratic operation thereof.

Such prior systems also fail to provide precise, continuous control for adjustably selectively controlling the duration and the intensity of the welding current to adapt apparatus of the subject character for flexible operation over a wide variety of working conditions. Moreover, the discharge of the energy accumulator or capacitor banks requires the use of costly control components of high current rating.

Accordingly, the present invention has for its object to provide a condenser discharge welding system capable of producing a welding current of sufficient intensity and duration to produce a weld.

Another object is to provide an improved capacitor discharge welding system for welding studs to a workpiece.

Another object is to provide a condenser discharge welding system which prolongs the duration of the condenser discharge with controllable reduction of the peak current intensity available therefrom.

Another object is to provide a stud welding apparatus in accordance with the foregoing which avoids ringing oscillations and current reversals obtained with the use of inductor devices for prolonging the current discharge.

A related object is to provide a stored energy discharge welding system that avoids the use of inductor devices for prolonging the welding current discharge and attendant problems presented thereby.

Another object is to provide a condenser storage discharge welding apparatus presenting a flexibility and adaptability of operation over a wide range and variety of operating conditions.

Another object is to provide a stored energy discharge welding apparatus affording flexible and efficient control over the adjustment of the intensity and duration of the discharge of the welding current.

Another object is to provide a capacitor storage discharge welding apparatus utilizing control components of lower cost, current rating, and heat and power dissipation.

SUMMARY OF THE INVENTION

Towards the accomplishment of the foregoing objects the invention provides a stud welding system which comprises a plurality of energy storage and discharge devices, controllable switching means connecting the energy storage and discharge devices in charging circuit relation with a power source, controllable switching means connecting each energy storage and discharge device in a separate discharge circuit with the stud and workpiece, controllable switching means connecting the stud and workpiece to receive a pilot arc current of less than welding intensity from the power source, means for initiating a welding operation, and sequence control timing means operable in response to the welding operation initiating means and coupled to said controllable switching means to interrupt the charging of said energy storage and discharge devices from the source of power, to initiate the flow of pilot arc current from the power source between the stud and workpiece, and thereafter to subsequently control the discharge of the energy storage and discharge devices through the stud and workpiece in adjustably timed succession to produce a current of welding intensity and/or duration greater than that produced by any one of the discharge devices alone.

DESCRIPTION OF THE PREFERRED EMBODIMENT

Figure 1:
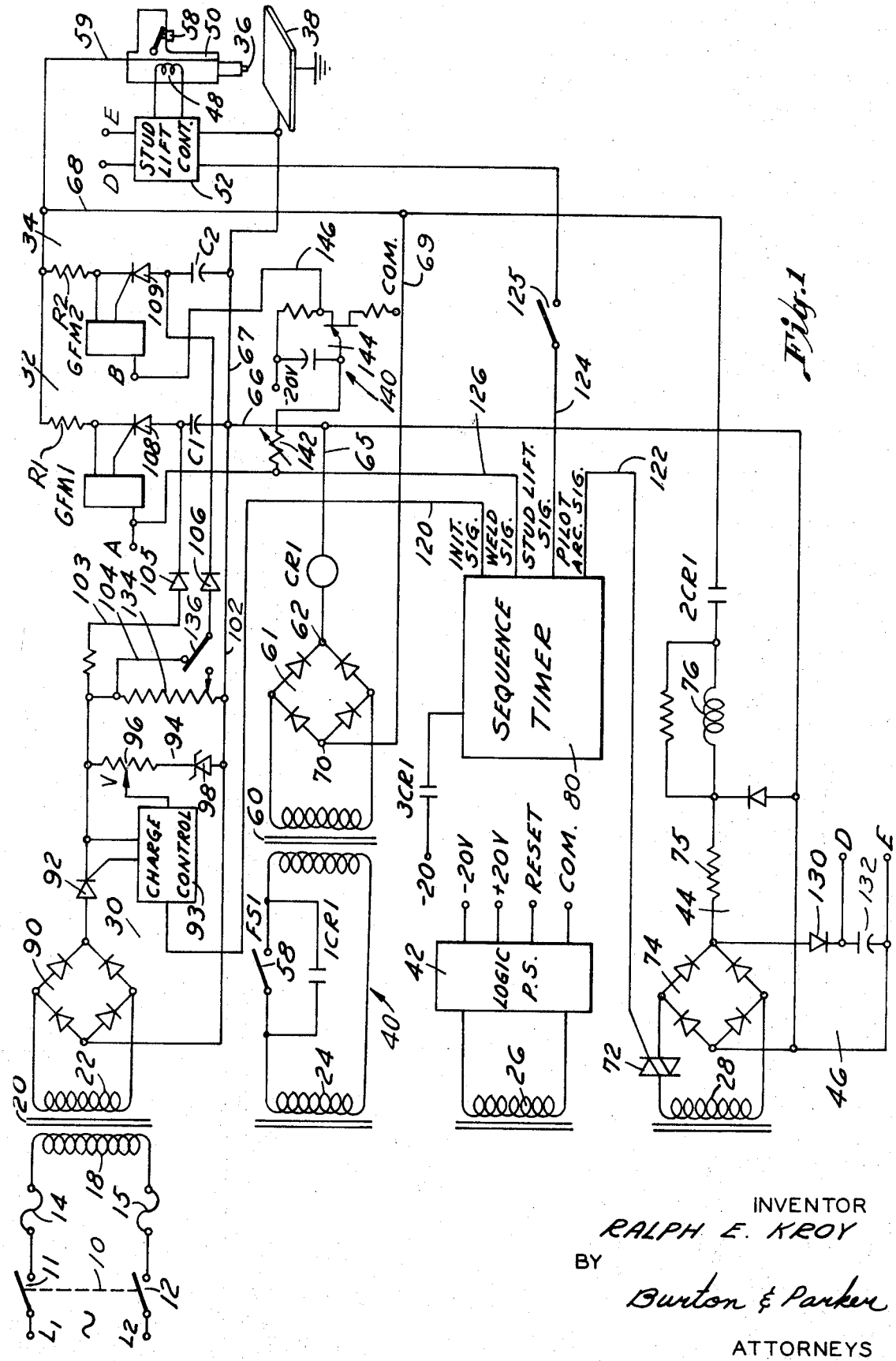
FIG. 1 is an electrical schematic circuit diagram of a capacitor discharge welding apparatus in accordance with the invention.

Referring to FIG. 1 of the drawings, a pair of main leads L1 and L2 are connected to a suitable and convenient source of power such as a conventional 110 volt AC source. The main leads are connected through poles 11 and 12 of a manually operable main disconnect switch 10 and line fuses 14 and 15 to the primary winding 18 of a transformer 20. The transformer has a plurality of secondary windings 22, 24, 26 and 28, which transform the primary voltage to 150 v., 24 v., 60 v., and 80 v., respectively, to supply the several separate circuits described below.

Secondary winding 22 is connected to supply charging current over a charging circuit 30 to a plurality of capacitor banks two of which are illustrated herein at C1 and C2. Illustrative capacitance values for each bank, which may be of the same or different storage capacity, may be 40,000 micro-farads, for example, and further banks in addition to the two shown may be provided. The banks are subsequently discharged through the stud 36 and workpiece 38 over separately controlled discharge circuits 32 and 34, each containing a different one of the banks.

Secondary winding 24 is connected in an initiation and control circuit 40 which serves to condition and control various circuits of the system in preparation for accomplishing a welding operation. The initiation circuit is operable when the applicator tool holding the stud is positioned against the workpiece and is operative upon actuation of a weld initiation control switch, as will be more fully described hereinafter.

Secondary winding 26 is connected to a logic power supply 42, which, in turn, develops and supplies the indicated voltages available from its output terminals to bias and drive the various logic circuit components contained in the sequence timer charge control network, firing circuits and stud lift initiation and drop-out timing control circuit included in the subject system.

Secondary winding 28 is associated with a pilot arc supply circuit 44 and a stud lift coil power circuit 46 and supplies current of less than welding intensity over the pilot arc circuit through the stud and workpiece preparatory to the discharge of the capacitor banks therethrough. The stud lift coil circuit 46 supplies rectified power from the secondary winding 28 to the stud lift coil 48, which is contained in the stud applicator tool 50 and retracts the stud from the workpiece to draw an arc that is initially supplied by the pilot arc current. The gun lift coil is under the control of an adjustable timing circuit 52, which controls the energization and de-energization of the stud lift coil and causes the stud to be plunged back toward the workpiece. Reference may be had to copending patent application U.S. Ser. No. 692,492 filed Dec. 20, 1967 in the name of Roland Vetter and of common ownership therewith for a stud lift timing control circuit used in a form of drawn arc stud welding apparatus.

The stud applicator tool 50 may be of the character illustrated and described in copending U.S. patent applications Ser. Nos. 369,115, and 485,007, also of common ownership herewith, and includes the lift coil 48 and a manually or otherwise operated trigger or initiation switch 58 for initiating a welding operation. For drawn arc welding applications, the studs 36 may be of the flat headed and tipless variety as distinguished from the pointed tip form of stud used in percussive welding to which principles of the present invention are also applicable. The studs are manually or automatically fed to and loaded in the tool chuck or stud holding electrode connected to a conductor 59. The stud holding electrode is retracted from the workpiece by the solenoid coil operated lift and retracting mechanism and is released to plunge the stud against the workpiece under the force of a compressed return spring or pressure operated drive cylinder upon de-energization of the lift coil.

Upon actuation of the trigger or initiation control switch 58, a circuit is completed through the contacts FS1 thereof, which are contained in the initiation control circuit 40 connecting the secondary transformer winding 24 through an isolation transformer 60 to or across the input terminals of a full wave bridge type rectifier 61. Rectified current is supplied over a circuit from output terminal 62 of the rectifier connected to one side of an initiation relay CR1, the other side of which is connected over lines 65, 66, and 67 to the workpiece 38 contacting the stud 36 and then through conductor 59 and lines 68 and 69 back to the other output terminal 70 of the rectifier 61.

Relay CR1 is shown as having three sets of normally open contacts associated therewith of which contacts 1CR1 shunt the contacts FS1 of switch 58 to maintain the control relay energized after the trigger switch is released. Contacts 2CR1 of the control relay are shown included in the output of the pilot arc current circuit 44 and permit current to be supplied from the secondary winding 28 through a controlled AC current controlling switch 72 as a bilateral conduction latching type or Triac device to another full wave bridge rectifier 74, a current limiting resistor 75 and choke filter 76 to the stud and workpiece, via lines 68, 59, 67 and 66. The third set of contacts 3CR1 of the control relay CR1 are shown connected to a sequence control timer 80 for initiating and sequencing the events to perform a welding operation.

The charging circuit 30 extends from the secondary winding 22 of the transformer 20 and includes a full wave bridge rectifier 90, a unidirectional conduction latching or SCR device 92, a charge control device 93 and a voltage sensing network 94. The voltage sensing network 94 comprises a serially connected adjustable resistor 96 and a Zener diode 98 whose anode is connected to the common bus conductor 102 to which the negative terminal of each of the capacitor banks is connected. The upper or high potential end of resistor 96 is connected over separate conductors 103 and 104 and through separate isolation or blocking diodes 105 and 106 to the high or + potential terminal or side of respective ones of the capacitor banks C1 and C2.

The sensing network 94 reflects the condition or state of charge of the capacitor banks and provides a voltage available at point V on the adjustable arm of the resistor 96 thereof to the charge control circuit device 93. The latter device may be a differencing network or amplifier which compares the voltage at point V against an internally contained or developed reference voltage and develops a logic level turn-on signal that is supplied to the gate control element of the SCR device 92 to maintain the SCR device in conducting condition as long as the voltage at point V and the reference voltage are unequal. At equilibrium when the voltage at point V balances the reference voltage, a logic level turn-off voltage developed by the charge control network is applied to the gate control element of the SCR 92 to prevent it from being continuously turned on, thereby to interrupt the charging of the capacitor banks from the power mains, the capacitors then being fully charged. The charge control circuit 93 includes an input control line or terminal labelled Charge Control, to which a control signal is supplied from the Sequence Timer 80 to turn off the SCR device 92 and effectively disconnect the capacitor banks from the charging power source.

The capacitor discharge circuits 32 and 34 are separate and independently operable circuits, each extending from the high potential side of a respective one of the capacitor banks and containing an SCR device as 108–109 and a current peak limiting and monitoring resistor, as 112–114, of low resistance value, say 0.01 ohm connected to the stud holding electrode of the work applicator tool. The cathode and the gate control element of each of the SCR devices 108 and 109 are connected across the output terminals of a corresponding one of a pair of gate firing modules, labelled GFM1 and GFM2. The gate firing modules are known forms of pulse forming devices each of which has an input terminal labelled A and B, respectively, controlled from the sequencing timer control device described below.

The sequencing timer control device 80 may be an electronic timer device providing a plurality of time displaced output signals therefrom upon initiation or actuation of the timer, as from the closing of the contacts 3CR1 of the control relay CR1. The timer may be formed of several semi-conductor timing networks each including at least a resistor, capacitor and unijunction element as included in the delay timer device 144 mentioned below. Alternatively, it could be a binary bit or a decade type counter with associated decoder elements, a form of which is illustrated in aforementioned U.S. patent application Ser. No. 692,492.

With the actuation or initiation of the sequence timer, it first supplies a logic level control signal over line 120 to the charge control device 93. In the illustrated circuit embodiment, the charge control device 93 is thus controlled to disable the controlled switch device 92 and effectively disconnect all of the capacitor banks from charging circuit relation with the transformed power source.

The sequence timer then outputs a pilot arc control signal over line 122 to enable the bilateral or bidirectional switching device 72 and supply current through the now closed contacts 2CR1 in the pilot arc circuit 44 to the stud, which is still in contact with the workpiece.

Substantially simultaneously with or slightly after the commencement of the flow of pilot arc current, the timer outputs a third control signal over line 124 to the stud lift timing control circuit 52 to permit current to be supplied over the stud lift power circuit 46 to the stud lift coil 48 for retracting the stud from the workpiece. The stud lift power circuit 46 is shown supplied from the bridge rectifier 74 and through isolation diode 130 and a filter capacitor 132 the terminals of which are connected via conductor lines D and E to the similarly labelled terminals of the stud lift timing circuit 52. A manually operated inhibit switch 125 may be provided in line 124 as shown to disable the stud lift energizing and timing circuit in those welding applications where the stud is not to be retracted from the workpiece.

With the retraction of the stud, an arc is drawn between the stud and the workpiece to heat the stud and workpiece and establish a low intensity arc path, which is initially supplied by the pilot arc current, for the higher intensity welding current. The latter current is subsequently applied through the established arc path from the controlled discharge of the capacitor banks.

The sequence timer then supplies a fourth time displaced signal over line 126 to the input terminal A of the gate firing module GFM1 to enable the discharge circuit 32 and commence the discharge of capacitor bank C1 through resistor R1 and the stud and workpiece. A predetermined time after the energization of the stud lift coil 48, the stud lift timing circuit 52 times out, causing the coil to be de-energized and the stud to be plunged toward the workpiece.

With the stated capacitance of 40,000 micro-farads for the capacity of bank C1 and a total resistance of, say, 0.06 ohm including the resistance value of resistor R1, in the discharge circuit, the discharge of bank C1 extends over a period of approximately 2.4 milliseconds. This discharge of capacitor bank C1 is of relatively short duration and may be insufficient to produce a satisfactory weld in most drawn arc welding applications.

In order to prolong the duration of the welding current, the present invention provides one or more additional capacitor banks, as the capacitor bank C2 connected in parallel with bank C1, and controls the several discharge circuits to discharge the capacitor banks in parallel and in a manner to provide a current of welding intensity duration greater than that produced by any one of the discharge devices acting alone. In the illustrated embodiment of the invention, the capacitor banks are of similar capacitance values and are charged to the same charging voltage level with each bank capable of producing a current of welding intensity level. However, the invention comprehends that the several capacitor banks may be of different capacitance values and that they could be charged in parallel as shown to different voltage levels or with unequal charging voltages through the use of multiple charging or charge control networks or a voltage adjusting potentiometer 134 and a selectivity positionable S.P.D.T. switch 136 connected in line 104 as shown.

In the drawn arc welding application of the invention, the second capacitor bank C2 is automatically controlled to discharge subsequently to capacitor bank C1 through the action of an electronic delay device 140, one form of which may comprise an adjustable resistance 142 connected between conductor 126 and the control input to a unijunction timing circuit 144. The timer device 140, which is adjustable to provide a delay of from zero to several milliseconds, is activated with the weld control signal supplied from the sequence timer 80 to capacitor bank C1 and supplies an output over line 146 when it times out to the input terminal B of the second gate firing module GFM2. The latter module or device controls the firing and turns on the SCR device 109 to conduct and enable the second discharge circuit 34 connecting capacitor bank C2 through the resistor R2 in circuit with the stud and workpiece.

Figure 2:
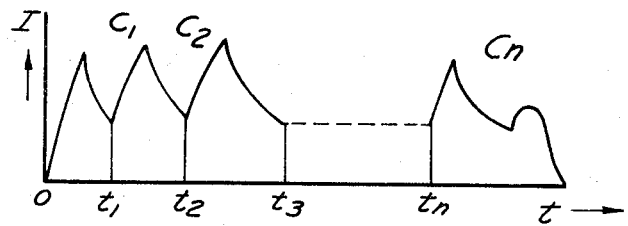
FIG. 2 is a generalized timing curve depicting the nature of the discharge from successively discharged capacitor banks.

In their sequential or time staggered operating mode, the parallel connected capacitor banks are successively discharged with the discharge of bank C2 being slightly displaced in time from the initiation of the discharge of bank C1 and occurring before the expiration of the discharge of bank C1. In this manner the duration of the welding current is extended by the cumulative effect of the total discharge current from the several energy accumulating storage banks. There is thus produced a current of extended welding intensity duration greater than that produced by any of the capacitor banks alone and without affecting the peak intensity of the discharge current available from any one of the banks alone as indicated in the generalized timing curve of FIG. 2.

Figure 3:
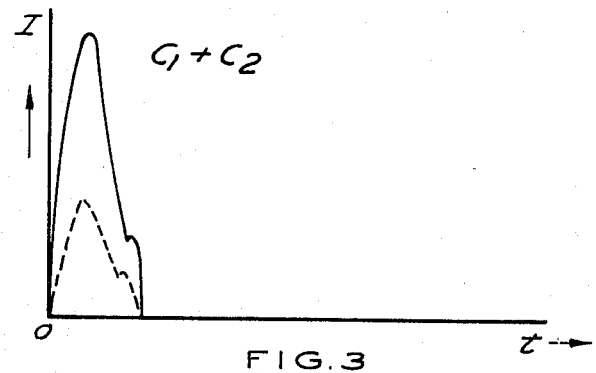
FIG. 3 illustrates the nature of the discharge for substantially simultaneously discharged capacitor banks.

Alternatively, the capacitor banks may be simultaneously fired, as for a percussive type welding application, for example, increasing the peak weld current, as indicated in FIG. 3 while the welding time is somewhat reduced.

The provision of the several capacitor banks in separate discharge circuits, whether fired simultaneously or in timed succession, decreases the current handling requirements of the components, such as the SCR devices, in the several circuits each of which provides or contributes a part of the total current in the external circuit to the stud and workpiece.

Figure 4:
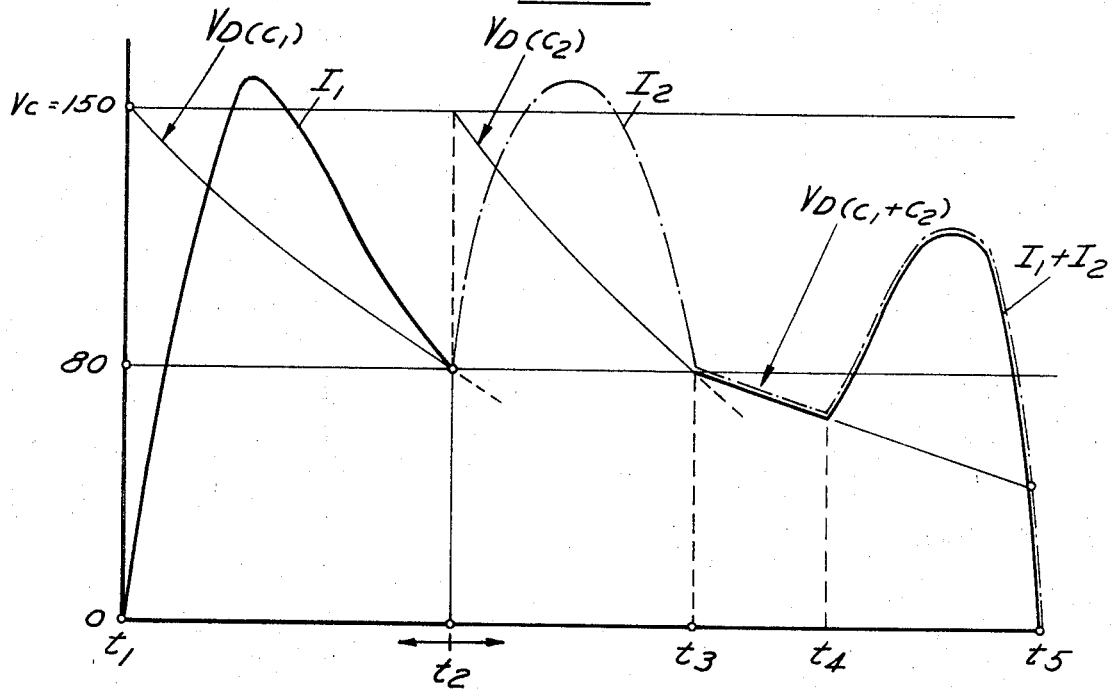
FIG. 4 illustrates the nature of the discharge and action taking place in a described mode of operation of the circuit of FIG. 1.

FIG. 4 illustrates the nature of the discharge resulting from the successive firing of the capacitor banks C1 and C2 where each bank is charged to the same voltage Vc of 150 v. and is of the same capacitance value. The discharge of capacitor bank C1 is initiated at time $t_1$, with curve $Vd(C_1)$ depicting the decay of the voltage discharge thereof and curve $I_1$, the nature of the discharge current therefrom.

At time, $t_2$, when the discharge of capacitor bank C2 is initiated, $V_d(C_1)$ had decayed from its initial 150 v. level to approximately 80 v., which is below the 150 v. level to which capacitor bank C2 is charged. This results in reverse biasing of SCR 108 in discharge circuit 32 and turning it off momentarily to interrupt the current from bank C1 as the voltage of bank C2 decays along the curve $Vd(C_2)$, the current discharge from bank C2 following the curve $I_2$.

At time $t_3$, $Vd(C_2)$ is approximately equal to the voltage on partially discharged bank C1, whereby SCR 108 is no longer reverse biased and can turn on again. Both capacitors then continue their simultaneous discharge along discharge curve $Vd(C_1+C_2)$, the slope or RC constant of which is equal to the combined slopes and times or time constants of curve $Vd(C_1)$ and curve $Vd(C_2)$.

At time $t_4$, the stud touches the workpiece, reducing the arc voltage from its initial substantially constant voltage value of 35 v. to 0 v. and causing the current to increase momentarily and rapidly decrease as shown.

It will be noted that the pilot arc current is derived from the power mains and not from the weld current capacitors. This aspect of the invention avoids unnecessarily draining and discharging the capacitors prior to the time the weld current is to be supplied therefrom. The capacitors are thus maintained in essentially fully charged condition and at a determinable precise charge level preparatory to being discharged and may be of smaller capacitance value than otherwise would be required if the pilot arc current were derived from the main supply capacitors.

What is claimed is:

1. Apparatus for welding a stud to a workpiece comprising:
    a plurality of separately controllable discharge circuits each containing energy storage means connected in discharge circuit relation with said stud and workpiece, means for connecting said storage means in charging circuit relation with a source of power, switching means in each of said discharge circuits for discharging the same, and control means connected to said switching means operable to selectively actuate the switching means to discharge energy from the discharge circuits to produce an effective value of welding energy at the stud and workpiece from the combined net effects of the storage means in the several discharge circuits that is of greater welding intensity than that produced by any one of said discharge circuits alone.

2. Stud welding apparatus in accordance with claim 1 wherein said switching means are separately and successively operated by said control means to discharge the respective discharge devices in succession.

3. Stud welding apparatus in accordance with claim 1 wherein said switching means are operated substantially simultaneously by said control means to produce a welding current through the stud and workpiece that is of greater peak value and effective value than that produced by any one of the discharge devices alone.

4. Stud welding apparatus in accordance with claim 1 including timing means controlling the operation of the switching means of the several discharge circuits.

5. Stud welding apparatus in accordance with claim 4 wherein said timing means is variable to adjust the displacement in time of the initiation of the discharge of one discharge circuit relative to the initiation of the discharge of another discharge circuit.

6. Stud welding apparatus in accordance with claim 1 wherein said energy storage means comprise capacitors, and wherein said discharge circuits are connected in parallel circuit relation to each other and in series circuit relation with the stud and workpiece.

7. Stud welding apparatus in accordance with claim 6 wherein said capacitors are charged in parallel from the power source and are discharged in parallel through the stud to the workpiece.

8. Stud welding apparatus in accordance with claim 6 including means controlling the voltage levels to which said capacitors are charged from the power source.

9. Stud welding apparatus in accordance with claim 1 further including:
    means energizable from the power source controlling the retraction of the stud from the workpiece to establish a gap therebetween and thereafter to return the stud to be welded to the workpiece,
    additional circuit means connecting the stud and workpiece to the power source to receive a current of low but of sufficient intensity therefrom to establish a priming arc path across the gap between the stud and workpiece as the stud is retracted therefrom,
    with said control means controlling the operation of the switching means of the several discharge circuits upon establishment of the priming arc path to discharge the energy storage means therein through the arc path established between the stud and workpiece until the stud is returned to the workpiece.

10. Apparatus in accordance with claim 9 wherein said control means controls the operation of the said switching means of the several discharge circuits in time staggered succession.

11. Apparatus in accordance with claim 10 further including controllable means for varying the time of discharge of the several circuits relative to one another.

12. A drawn arc welding apparatus for welding a stud to a workpiece and comprising the combination of, a plurality of energy storage and discharge devices each capable of producing a current of welding intensity, a charging circuit connecting the energy storage and discharge devices to be charged from a source of power and including control switching means therein operable to interrupt the charging of the energy storage and discharge devices from the power source, a stud lift coil energizable to retract the stud from the workpiece, additional control switching means operable to connect the power source in a circuit for energization of the stud lift coil and in a circuit with the stud and workpiece to supply a pilot arc current therethrough of less than welding intensity from the power source, a plurality of discharge circuits each containing a different one of said energy storage and discharge devices and a different one of a plurality of separately controllable switching means selectively operable to connect the energy storage and discharge device of its associated circuit in discharge circuit relation with the stud and workpiece, means for initiating a welding operation, and sequence control means operable in response to said welding operation initiating means and controlling the operation of the control switching means of the aforesaid circuits to disconnect the charging of said energy storage and discharge devices from the source of power and to initiate the flow of pilot arc current from the power source between the stud and the workpiece, to energize the lift coil from the power source and retract the stud from the workpiece, and thereafter to successively discharge said energy storage and discharge devices through the stud and the workpiece to produce a current of welding intensity duration greater than that produced by any one of said discharge devices alone.

13. A capacitive energy discharge stud welding apparatus energizable from an external source of power and comprising means energizable from the source of power and adapted to retract a stud from a workpiece to produce a gap therebetween and thereafter to return the stud against the workpiece to be welded thereto, a pilot arc circuit connecting the stud and workpiece in current receiving relation with said external source of power and establishing a pilot arc across the gap between the stud and workpiece when the stud is retracted from the workpiece, a first capacitive energy storage and discharge means and a first energy discharge circuit, a second capacitive energy storage and discharge means and a second energy discharge circuit, and control means coupled to each of said first and second energy discharge circuits and operable upon establishment of said pilot arc to connect said first capacitive energy storage and discharge means with the stud and workpiece and discharge a current of welding intensity through the established arc, and thereafter to connect to said second capacitive energy storage and discharge means with said stud and workpiece and in parallel with said first energy storage and discharge means to sustain a current of welding intensity between the stud and workpiece until the stud is returned to the workpiece.

14. Apparatus in accordance with claim 13 wherein said control means comprises timing means controlling the operation of said second energy discharge circuit to discharge a predetermined time subsequent to the first energy discharge circuit.

15. Apparatus in accordance with claim 14 wherein said timing means is adjustable.

References Cited
UNITED STATES PATENTS

| | | | | |
|---|---|---|---|---|
| 2,610,278 | 9/1952 | Graham | 219—98 |
| 2,853,593 | 9/1958 | Albrecht | 219—113 |
| 3,267,299 | 8/1966 | Bartelink | 320—1 X |
| 3,291,958 | 12/1966 | Glorioso | 219—98 |
| 3,414,700 | 12/1968 | Glorioso | 219—98 |
| 3,414,701 | 12/1968 | Guettel | 219—98 |
| 3,423,558 | 1/1969 | Brennen | 219—98 |

JOSEPH V. TRUHE, Primary Examiner

M. C. FLIESLER, Assistant Examiner

U.S. Cl. X.R.

219—112